United States Patent
Kim et al.

(10) Patent No.: US 10,248,208 B2
(45) Date of Patent: Apr. 2, 2019

(54) TACTILE TRANSMISSION DEVICE AND USER INTERFACE SYSTEM HAVING SAME

(71) Applicant: KOREA INSTITUTE OF SCIENCE AND TECHNOLOGY, Seoul (KR)

(72) Inventors: Keehoon Kim, Seoul (KR); Donghyun Hwang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 35 days.

(21) Appl. No.: 15/567,421

(22) PCT Filed: Aug. 10, 2015

(86) PCT No.: PCT/KR2015/008332
§ 371 (c)(1),
(2) Date: Oct. 18, 2017

(87) PCT Pub. No.: WO2016/171335
PCT Pub. Date: Oct. 27, 2016

(65) Prior Publication Data
US 2018/0136729 A1      May 17, 2018

(30) Foreign Application Priority Data
Apr. 23, 2015  (KR) .................. 10-2015-0057088

(51) Int. Cl.
G06F 3/01      (2006.01)
G06F 3/0346    (2013.01)

(52) U.S. Cl.
CPC ............... *G06F 3/016* (2013.01); *G06F 3/01* (2013.01); *G06F 3/011* (2013.01); *G06F 3/0346* (2013.01);
(Continued)

(58) Field of Classification Search
CPC ........ G06F 3/016; G06F 3/011; G06F 3/0346; G06F 3/01; G06F 2203/0384; G06F 2203/0331
See application file for complete search history.

(56) References Cited

U.S. PATENT DOCUMENTS 6,110,130 A    8/2000  Kramer
9,001,032 B2   4/2015  Yang et al.
(Continued)

FOREIGN PATENT DOCUMENTS

JP    2005-293512 A    10/2005
JP    2006-212635 A    8/2006
(Continued)

OTHER PUBLICATIONS

Naoki Kawakami et al., "Gravity Grabber: Wearable Haptic Display to present Virtual Mass Sensation", ACM SIGGRAPH, 2007.
(Continued)

*Primary Examiner* — Amit Chatly
(74) *Attorney, Agent, or Firm* — Rabin & Berdo, P.C.

(57) ABSTRACT

A tactile transmission device for transmitting a tactile sensation to a user's finger comprises: a ring-type body which is put on a finger; a moving member which is formed such that the moving member can move with respect to the body; and a plurality of wire-type actuators which are formed so as to come in contact with the moving member, wherein each of the wire-type actuators is a solid-state actuator which changes in length when energy is applied thereto, a force applied to the moving member as the plurality of wire-type actuators change in length causes the moving member to move with respect to the body, and a contact part formed in the moving member comes into contact with a user's finger according to a movement of the moving member, so as to transmit a tactile sensation to the user.

15 Claims, 17 Drawing Sheets

(52) U.S. Cl.
CPC ........... *G06F 2203/0331* (2013.01); *G06F 2203/0384* (2013.01)

(56) References Cited

U.S. PATENT DOCUMENTS

| | | | |
|---|---|---|---|
| 9,298,259 B2 | 3/2016 | Wiertlewski et al. | |
| 9,396,629 B1* | 7/2016 | Weber | G08B 6/00 |
| 2002/0046619 A1 | 4/2002 | Uchida et al. | |
| 2003/0016207 A1* | 1/2003 | Tremblay | G06F 3/011 |
| | | | 345/156 |
| 2011/0155044 A1* | 6/2011 | Burch | G06F 3/016 |
| | | | 116/205 |
| 2017/0319136 A1* | 11/2017 | Kosonen | G06F 1/163 |

FOREIGN PATENT DOCUMENTS

| | | |
|---|---|---|
| JP | 2010-003312 A | 1/2010 |
| JP | 2013-537660 A | 10/2013 |
| JP | 5472539 B2 | 4/2014 |
| KR | 10-0571428 B1 | 4/2006 |
| KR | 10-2007-0066931 A | 6/2007 |
| KR | 10-2014-0131175 A | 11/2014 |
| KR | 10-2015-0013017 A | 2/2015 |
| WO | WO 2011-122718 A1 | 10/2011 |

OTHER PUBLICATIONS

Brian T. Gleeson et al., "Design of a Fingertip-Mounted Tactile Display with Tangential Skin Displacement Feedback", IEEE Transactions on Haptics, Oct.-Dec. 2010, pp. 297-301, vol. 3, No. 4.

Domenico Prattichizzo et al., "Towards Wearability in Fingertip Haptics: A 3-DoF Wearable Device for Cutaneous Force Feedback", IEEE Transactions on Haptics, Oct.-Dec. 2013, pp. 506-516, vol. 6, No. 4.

* cited by examiner

TACTILE TRANSMISSION DEVICE AND USER INTERFACE SYSTEM HAVING SAME

DESCRIPTION OF GOVERNMENT-SPONSORED RESEARCH AND DEVELOPMENT

This research is done in support of National Research Foundation of Korea (Global frontier business, technology development of electromyography signal based motion intention estimation and active tactile sensory recovery for sensory-motor operation through telepresence, Project serial number: 1711015376), Ministry of Science, ICT and Future Planning, under the supervision of Korea Institute of Science and Technology.

TECHNICAL FIELD

The present disclosure relates to a tactile transmission device and a user interface system having the same, and more particularly, to a wearable tactile transmission device for transmitting a tactile sensation to a user's finger and a user interface system having the same.

BACKGROUND ART

With the industrial development, user interface systems have been variously developed to allow users to operate slave robots or virtual graphics (hereinafter referred to as "avatar") as intended in virtual environment/augmented environment/remote environment.

Human fingers have the capability of precise movements and are sensitive to tactile stimuli, and are thus widely used as means to drive interface systems.

In these interface systems, avatars to be controlled and environment in which the avatars operate are not a space in which users cannot experience in person, and accordingly devices for providing users with tactile feedback are devised for more realistic and accurate control.

The tactile transmission device according to the related art generally creates a tactile sensation on a finger by transmitting the output of an actuator such as a motor to a linkage, and applying a force to a distal part putted on the finger through the linkage.

However, the tactile transmission device according to the related art often takes the form of external skeleton including the wrist and the hand such that the actuator is positioned at the back of the hand or the wrist and the output of the actuator is transmitted to the finger.

According to this conventional configuration, it is not easy to put on and take off, and wearability and users' mobility is poor. Furthermore, the device is intricate and has relatively large volume and weight, resulting in a significant reduction in usability and portability.

In addition, there is a limitation in constructing realistic interface systems due to limited types of tactile sensation that can be expressed.

DISCLOSURE

Technical Problem

Disclosed herein is a tactile transmission device with high wearability and mobility due to a simple and convenient structure and enhanced usability because of providing various types of tactile sensation, and a user interface system having the same.

Technical Solution

According to an aspect of the present disclosure, there is provided a tactile transmission device for transmitting a tactile sensation to a user's finger, including a ring-type body which is put on a finger, a moving member which is formed such that the moving member can move with respect to the body, and a plurality of wire-type actuators which are formed so as to come in contact with the moving member, wherein each of the wire-type actuators is a solid-state actuator which changes in length when energy is applied thereto, a force applied to the moving member as the plurality of wire-type actuators change in length causes the moving member to move with respect to the body, and a contact part formed in the moving member comes into contact with a user's finger according to a movement of the moving member, so as to transmit a tactile sensation to the user.

According to an embodiment, at least one end of the plurality of wire-type actuators is fixed to the body, and each of the wire-type actuator contracts the length to pull the moving member when the energy is applied.

According to an embodiment, the moving member includes a vertical moving member which moves with respect to the body in vertical direction toward skin of the finger, and a horizontal moving member which moves with respect to the vertical moving member in horizontal direction perpendicular to the vertical direction, and the contact part is formed in the horizontal moving member such that the contact part faces the finger.

According to an embodiment, the contact part is formed in a shape of a protrusion protruding toward the finger.

According to an embodiment, when the vertical moving member moves to lowest, the body is held in position with a gap between an upper surface of the contact part and the finger.

According to an embodiment, the wire-type actuator includes a vertical drive wire having two ends fixed to the body, the vertical drive wire extending to cover a bottom of the vertical moving member in a middle of a length, and when energy is applied to contact the vertical drive wire, the vertical moving member moves upward approaching the finger.

According to an embodiment, the body has a spring which applies a force downward, and when the energy applied to the vertical drive wire is interrupted, the vertical moving member moves downward by the force of the spring.

According to an embodiment, the wire-type actuator includes a first horizontal drive wire having one end fixed to one side surface of the body, and the other end fixed to one side surface of the horizontal moving member, and a second horizontal drive wire having one end fixed to the other side surface of the body, and the other end fixed to the other side surface of the horizontal moving member, the first horizontal drive wire and the second horizontal drive wire are placed to pull the horizontal moving member in opposite directions, and when energy is applied to selectively contact the first horizontal drive wire and the second horizontal drive wire, the horizontal moving member is moved in horizontal direction with respect to the body.

According to an embodiment, the body has a wire receiving groove on side and upper surfaces to receive the first horizontal drive wire and the second horizontal drive wire, and the first horizontal drive wire and the second horizontal drive wire extend around the side and upper surfaces of the body along the wire receiving groove.

According to an embodiment, top of the body has a control device to control the length change of the wire-type actuator, a battery to supply power to the control device, and a wireless communication device to transmit a control signal transmitted from outside to the control device.

According to an embodiment, the body includes an upper frame which covers top of the finger, and a lower frame which covers bottom of the finger, and a length of the upper frame extending in lengthwise direction of the finger is longer than a length of the lower frame.

According to another aspect of the present disclosure, there is provided a user interface system for moving an avatar in response to a finger's motion, including the tactile transmission device, and a computer to link the avatar with the finger's motion, wherein when a predetermined contact occurs to the avatar, the contact part comes into contact with the user's finger and transmits a tactile sensation.

According to an embodiment, the tactile transmission device of the user interface system is configured such that as the vertical moving member comes into contact with the finger and moves upward approaching the finger, the contact part applies pressure to the finger, and as the vertical moving member reciprocates upward and downward, the contact part applies vibration to the finger.

According to an embodiment, the tactile transmission device of the user interface system is configured such that as the contact part comes into contact with the finger and the horizontal moving member moves in horizontal direction, the contact part applies a shear force to the finger.

According to an embodiment, the user interface system includes a plurality of tactile transmission devices which is put on each finger of a hand or each finger knuckle.

BEST MODE

Figure 1:
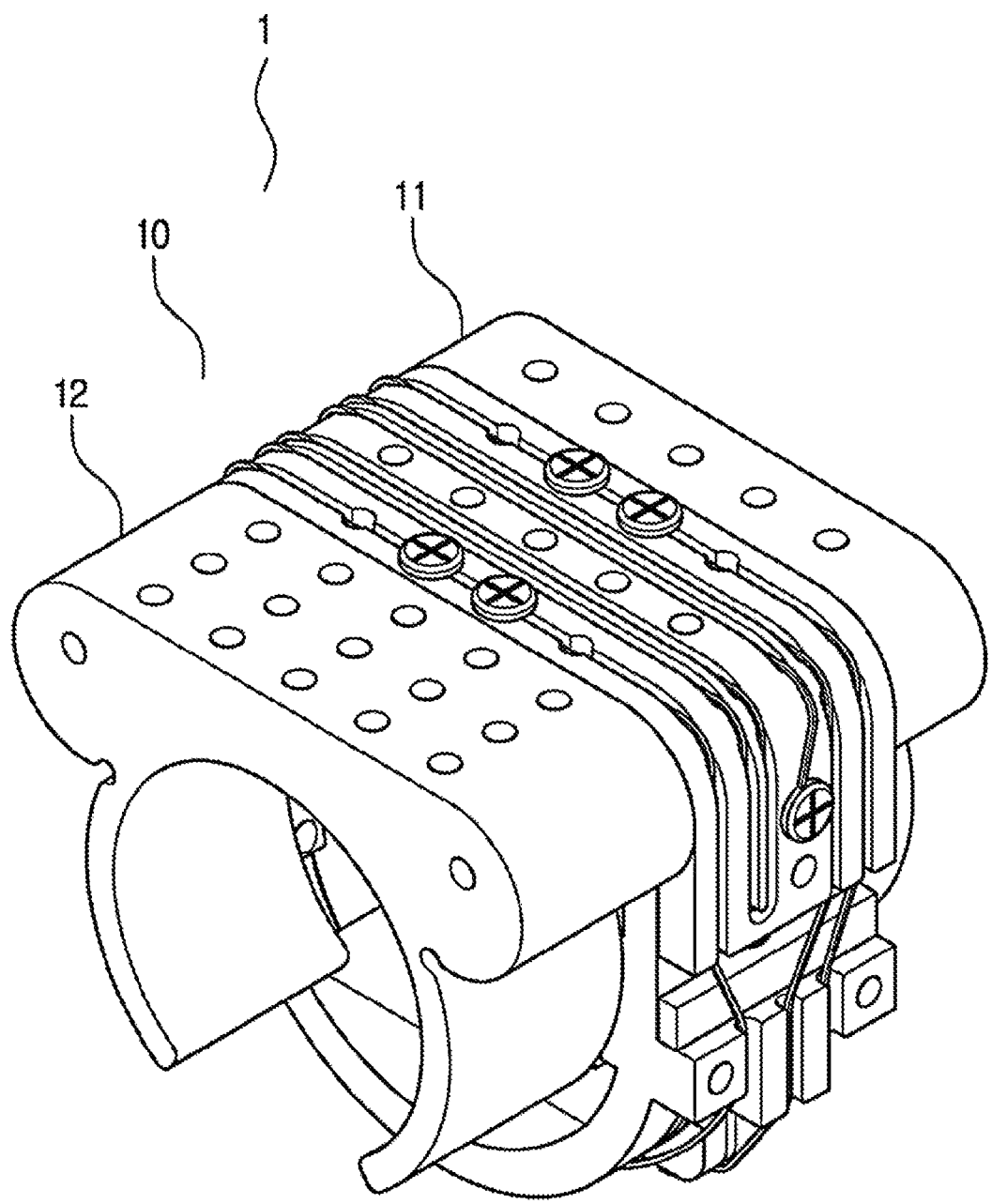
FIG. 1 is an assembled perspective view of a tactile transmission device according to an embodiment of the present disclosure.

Hereinafter, the preferred embodiments of the present disclosure will be described with reference to accompanying drawings. The present disclosure is described with reference to the embodiments shown in the drawings, but this is described as an embodiment, and the technical spirit of the present disclosure and its key elements and operation are not limited thereby.

Figure 2:
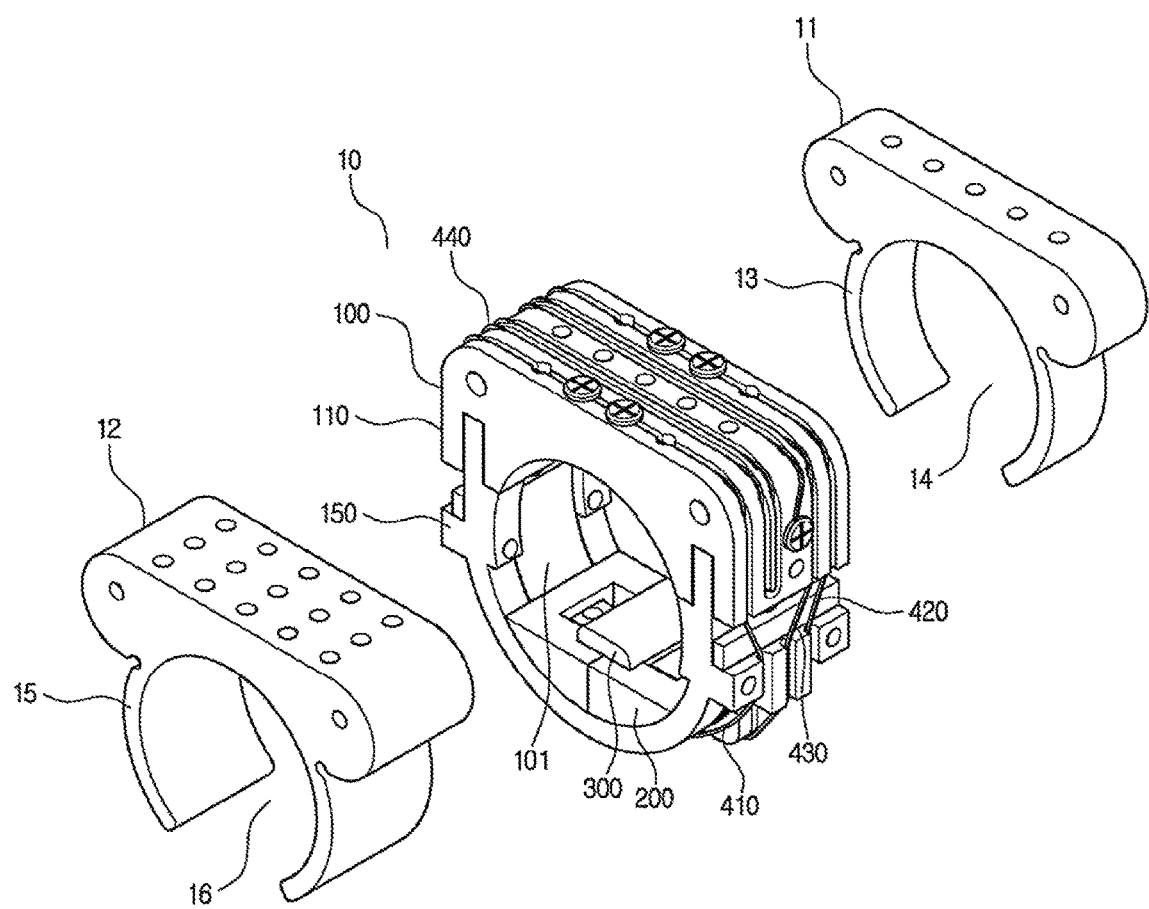
FIG. 2 is an exploded perspective view of the tactile transmission device of FIG. 1.

FIG. 1 is an assembled perspective view of a tactile transmission device 1 according to an embodiment of the present disclosure, and FIG. 2 is an exploded perspective view of the tactile transmission device 1.

As shown in FIGS. 1 and 2, the tactile transmission device 1 includes a body 10 to transmit a tactile sensation to a user, and a front clamp 12 and a rear clamp 11 connected to the front and rear of the body 10 to fix the position of the body 10 to the user's finger.

The body 10 includes a ring-type body 100 that is fitted to the finger, a moving member 200 formed moveably with respect to the body 100, and a plurality of wire-type actuators 410, 420, 430, 440 formed to come into contact with the moving member 200.

The body 100 includes an upper frame 110 having an approximately "⊏" shape, and a lower frame 150 connected to the upper frame 110.

The body 100 has a circular space 101 at the center, and the user's finger is inserted into the space 101.

The moving member 200 is formed such that it can move with respect to the lower frame 150. The moving member 200 has a contact part 300 protruding inward the space 101.

The contact part 300 according to this embodiment is in the shape of a flat protrusion having a quadrangular cross section, but may be formed in various shapes including a hemispherical shape.

Each of the wire-type actuators 410, 420, 430, 440 according to this embodiment is a solid-state actuator composed of a strand of wire. The solid-state actuator is an actuator that generates mechanical energy such as a force and displacement upon deformation of a solid-state material when external energy (electricity, heat, etc.) is applied. For example, shape memory alloy (SMA), shape memory polymer and dielectric elastomer may be used for the wire-type actuator according to this embodiment.

The wire-type actuator according to this embodiment is a strand of wire made of SMA material, and is configured to actively change the length when energy is applied.

As the plurality of wire-type actuators 410, 420, 430, 440 changes the length, a force is applied to the moving member 200, and in response to this, the moving member 200 moves the position with respect to the body 100. As the moving member 200 changes, the contact part 300 comes into contact with the user's finger and transmits a tactile sensation. A pressure sensor or a force sensor may be placed on the top of the contact part 300 to detect the contact with the finger.

Hereinafter, the configuration of the body 10 of the tactile transmission device 1 will be described in more detail with reference to FIGS. 3 to 8.

Figure 3:
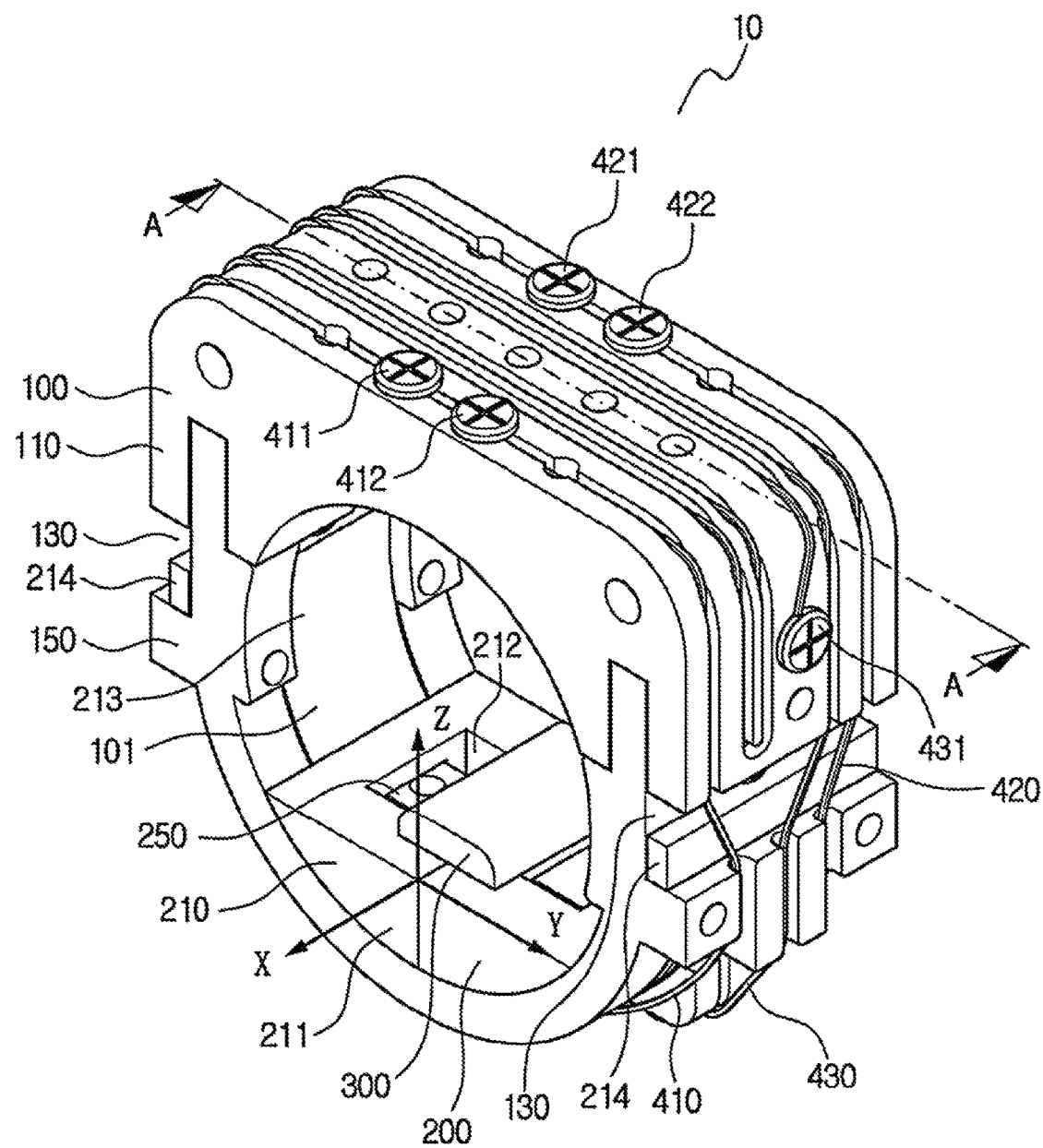
FIG. 3 is a perspective view of a body of the tactile transmission device of FIG. 1.
Figure 4:
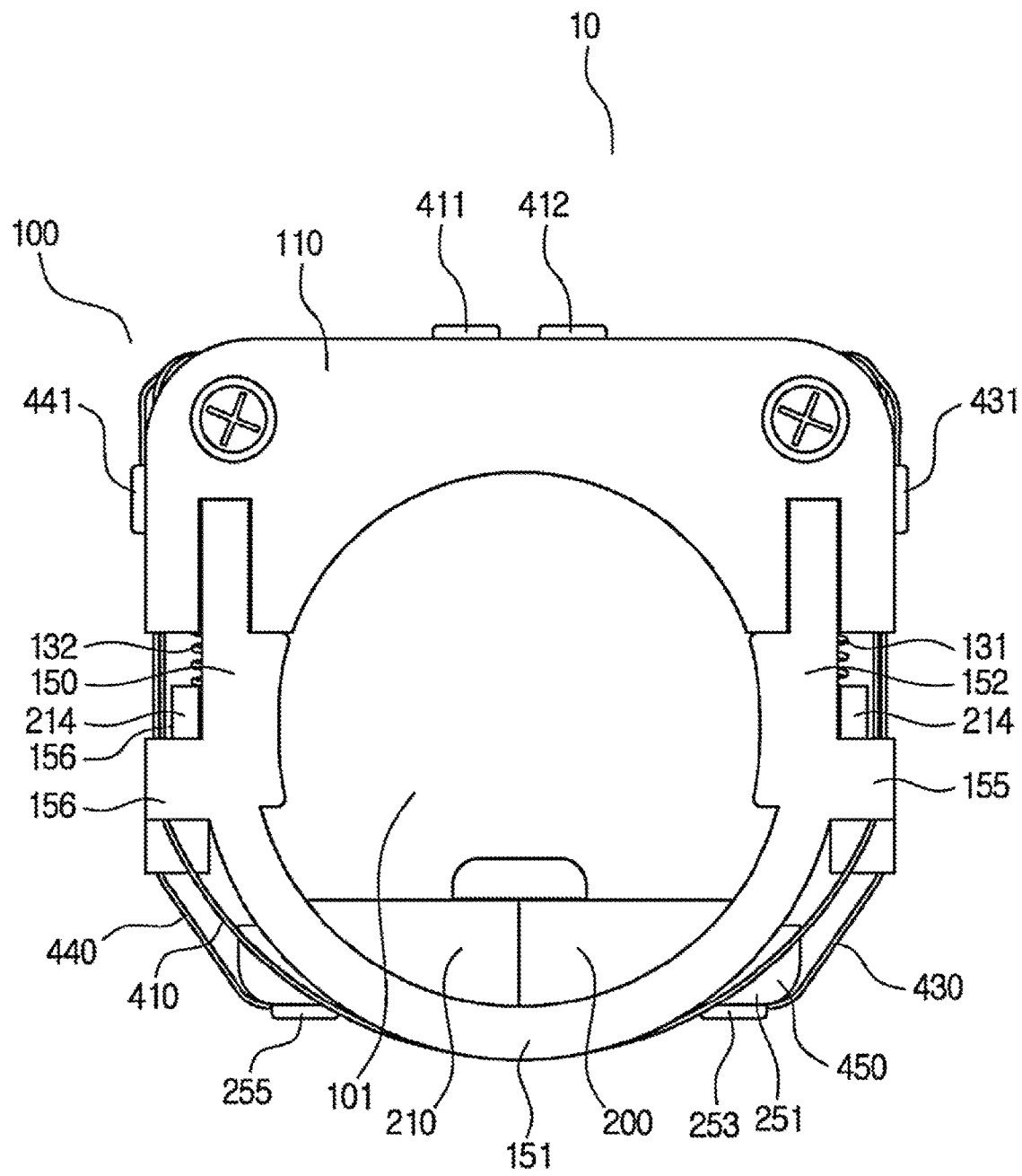
FIG. 4 is a front view of the body of FIG. 3.
Figure 5:
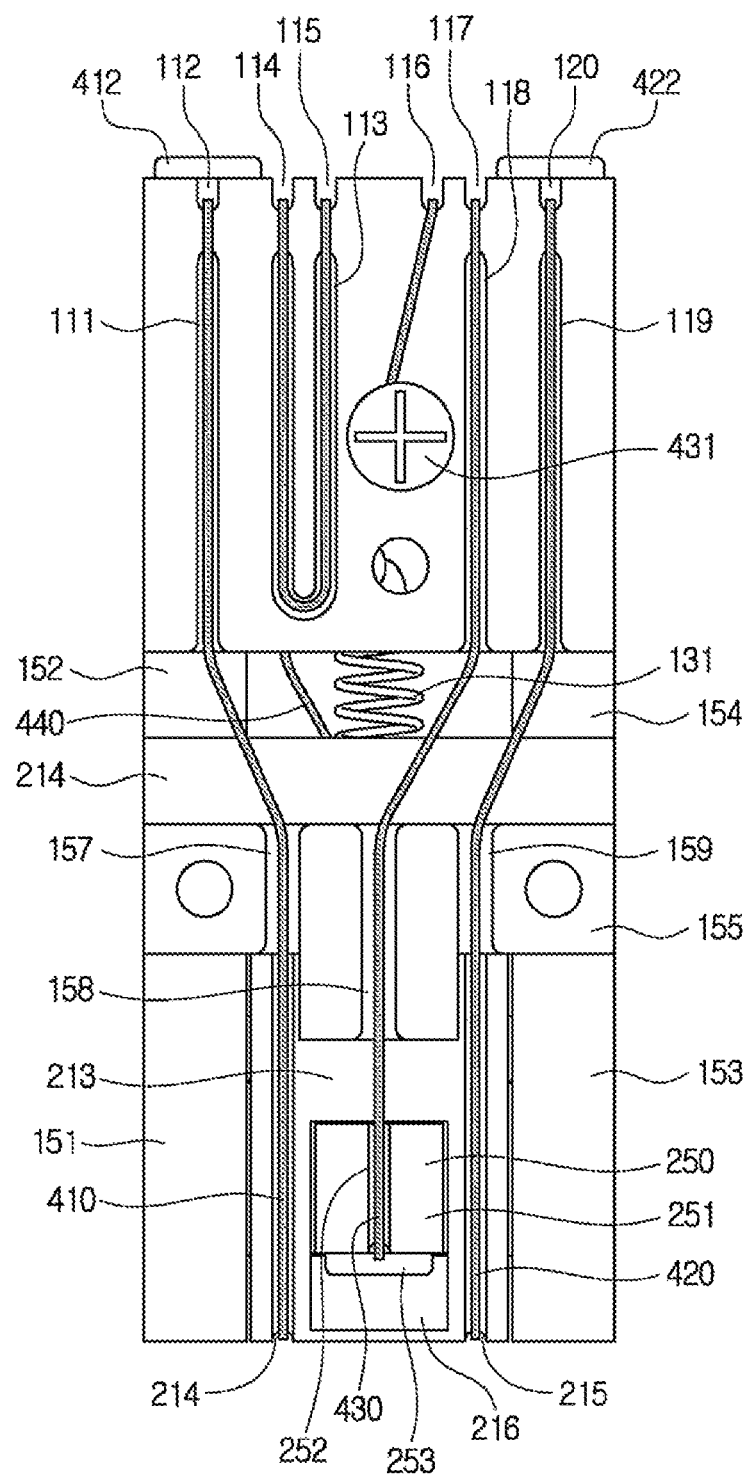
FIG. 5 is a left side view of the body of FIG. 3.
Figure 6:
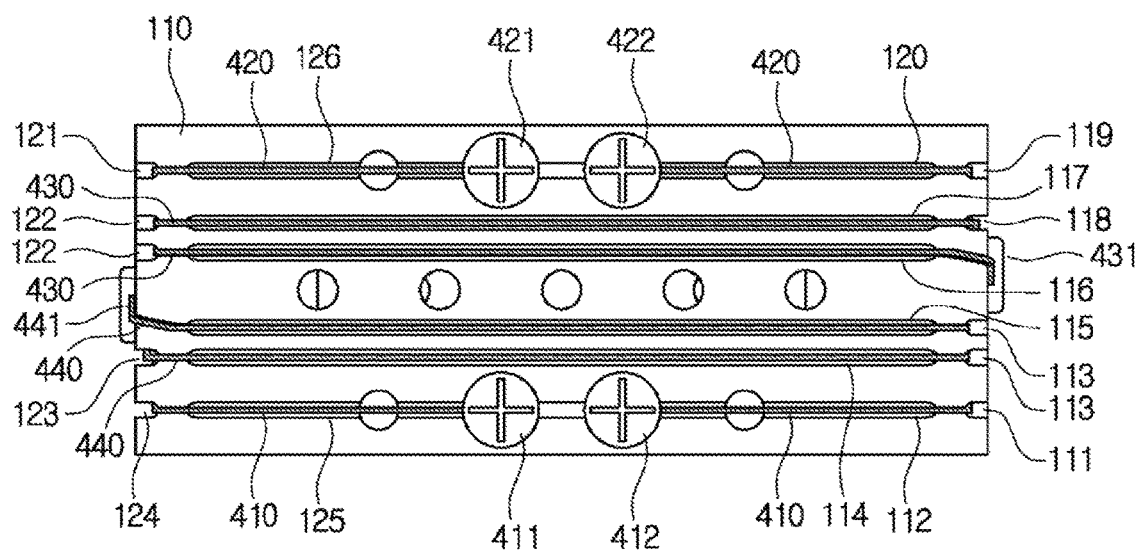
FIG. 6 is a plane view of the body of FIG. 3.
Figure 7:
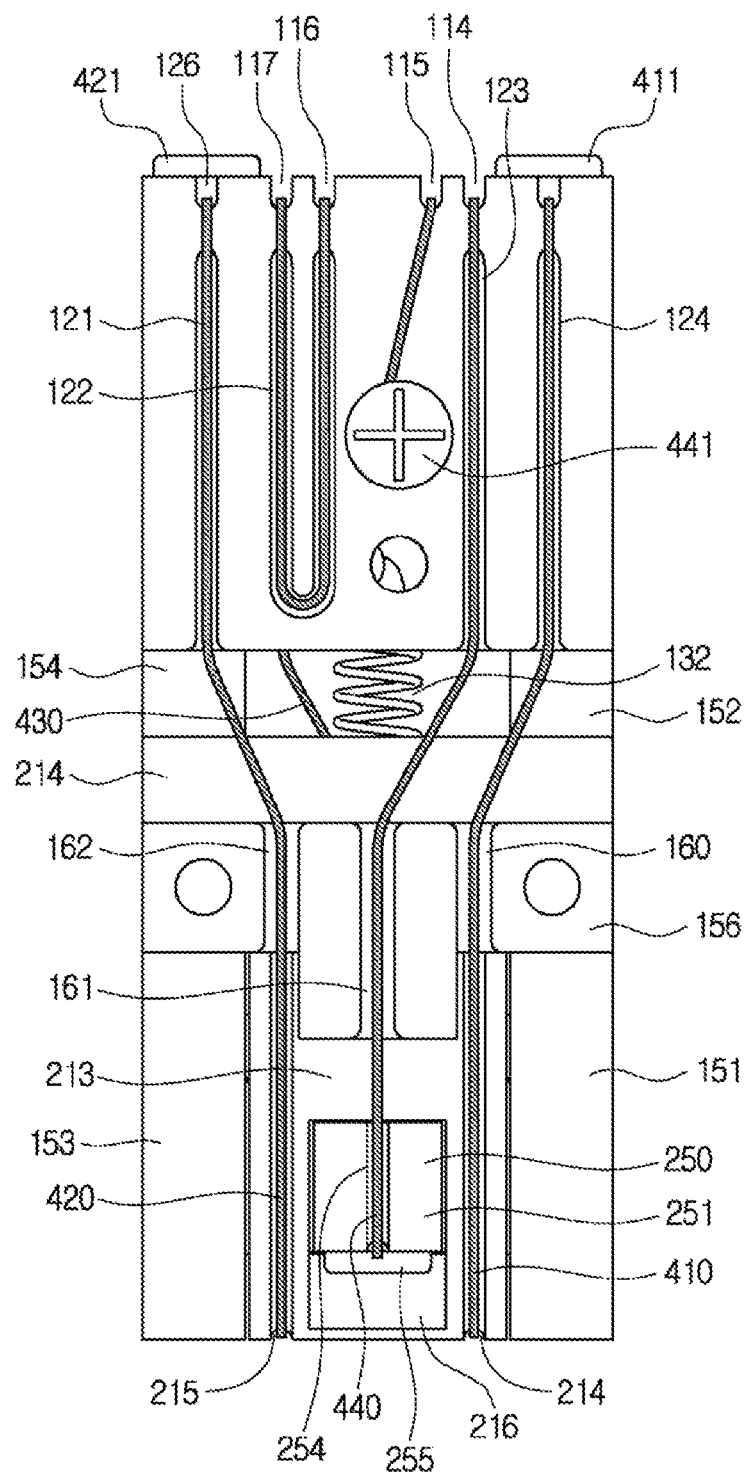
FIG. 7 is a right side view of the body of FIG. 3.

FIG. 3 is a perspective view of the body 10 according to this embodiment, FIG. 4 is a front view of the body 10, FIG. 5 is a left side view of the body 10, FIG. 6 is a plane view of the body 10, and FIG. 7 is a right side view of the body 10.

Figure 8:
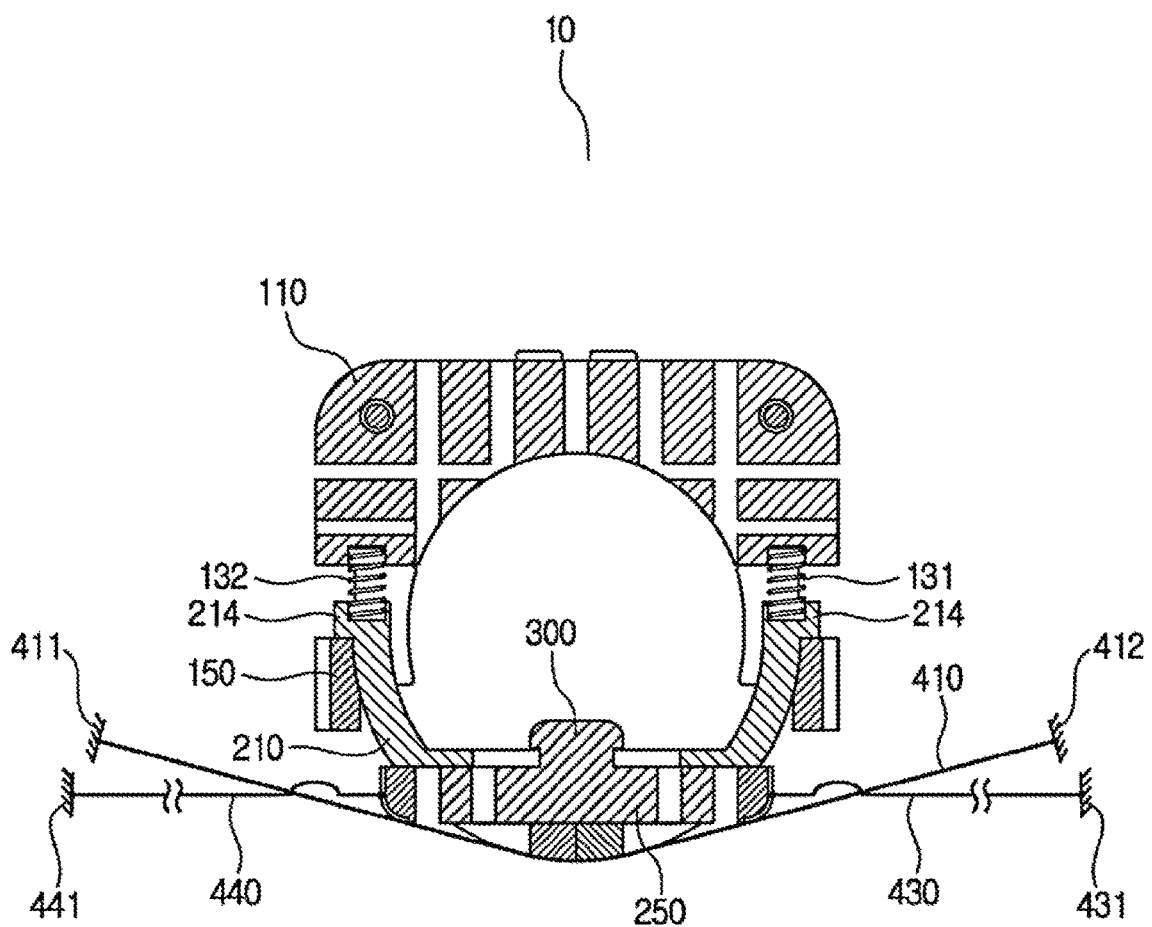
FIG. 8 is a cross-sectional view taken along the line A-A of FIG. 3.

FIG. 8 is a cross-sectional view taken along the line A-A of FIG. 3. In FIG. 8, fixed ends of the wire-type actuators 410, 430, 440 are shown separately for convenience of description.

As shown in FIGS. 3 to 8, the body 100 is formed such that part of the lower frame 150 is inserted into the upper frame 110, and has a ring shape with the circular space 101.

The lower frame 150 includes front frames 151, 152 and rear frames 153, 154 spaced apart from each other with a gap between to conform the length of the upper frame 110. Two side frames 155, 156 connect the front frames 151, 152 to the rear frames 153, 154 across them.

The moving member 200 includes a vertical moving member 210 that moves with respect to the body 100 in vertical direction (z direction) toward the skin of the finger, and a horizontal moving member 250 that moves with respect to the vertical moving member 210 in horizontal direction (in this embodiment, y direction) perpendicular to the vertical direction.

The vertical moving member 210 includes a body part 211, an extension part 213 extending from two ends of the body part 211, and a guide part 214 formed at the ends of the extension part 213.

The body part 211 has an approximately hemispherical shape and a length across the front frames 151, 152 and the rear frames 153, 154 in whole. The body part 211 is placed in the inner space 101 such that it is laid on the front frames 151, 152 and the rear frames 153, 154.

The extension part 213 is inserted into the gap between the front frames 151, 152 and the rear frames 153, 154.

The guide part 214 protrudes sideward from the extension part 213, and has a length across the front frames 151, 152 and the rear frames 153, 154 on the outer side of the two frames.

The guide part 214 comes into close contact with the side surface of the front frames 151, 152 and the rear frames 153, 154, and plays a role in guiding the vertical linear movement of the vertical moving member 210 without rotation.

The body part 211 has a hole having a quadrangular cross section at the center of the body part 211 throughthere, and a moving body 251 of the horizontal moving member 250 is slidably inserted into the hole. Left and right ends of the moving body 251 are exposed to the outside through an opening 216 of the hole.

The body part 211 has a top opening 212 that communicates with the hole on the top. The contact part 300 has a head having a length that is greater than a width of the top opening 212, and a neck that extends from the head through the top opening 212 and is connected to the moving body 251.

The horizontal moving member 250 moves in horizontal direction with respect to the vertical moving member 210 along lengthwise direction of the top opening 212 (y direction).

The body 10 according to this embodiment includes two rows of wire-type actuators (hereinafter, referred to as "vertical drive wire") 410, 420 to vertically move the vertical moving member 210.

Two ends of the first vertical drive wire 410 are each fixed by bolts at fixed ends 411, 412 formed on the top of the upper frame 110.

The first vertical drive wire 410 having the two ends fixed to the fixed ends 411, 412 extends along the surface of the upper frame 110, goes across the outer surface of the extension part 213 of the vertical moving member 210 in the middle of the length, and covers the bottom of the body part 211.

A wire receiving groove 112 extending longitudinally from the fixed end 412 in widthwise direction of the upper frame 110 (y direction) is formed on an upper surface of the upper frame 110, and a wire receiving groove 111 running vertically downward is formed on one side surface of the upper frame 110. Furthermore, a wire receiving groove 157 running downward vertically is formed in the side frame 155 of the lower frame 150, and a wire receiving groove 214 is formed around the bottom of the vertical moving member 120.

A wire receiving groove 160 is formed in the other side frame 156 of the lower frame 150, and a wire receiving groove 124 and a wire receiving groove 125 are formed in the upper frame 110 and extend to the fixed end 411.

The first vertical drive wire 410 extending from the fixed end 412 extends to the fixed end 411 such that the first vertical drive wire 410 is received in the wire receiving grooves 112, 111, 157, 214, 160, 124, 125.

The first vertical drive wire 410 is formed with slight elasticity, and is pulled tight such that two ends are fixed to the two fixed ends 411, 412. Accordingly, the first vertical drive wire 410 is apt to length contraction (separately from power application), and comes into contact with the periphery of the body 10 in whole due to the tension.

Two ends of the second vertical drive wire 420 are each fixed by bolts at fixed ends 421, 422 formed on the top of the rear part of the upper frame 110.

The second vertical drive wire 420 having the two ends fixed to the fixed ends 421, 422 extends along the surface of the upper frame 110, goes across the outer surface of the extension part 213 of the vertical moving member 210 in the middle of the length, and covers the bottom of the body part 211.

A wire receiving groove 120 extending longitudinally from the fixed end 422 in widthwise direction of the upper frame 110 (y direction) is formed on the upper surface of the upper frame 110, and a wire receiving groove 119 running downward vertically is formed on one side surface of the upper frame 110. Furthermore, a wire receiving groove 159 running downward vertically is formed in the side frame 155 of the lower frame 150, and a wire receiving groove 215 is formed around the bottom of the vertical moving member 120.

A wire receiving groove 162 is formed in the other side frame 156 of the lower frame 150, and a wire receiving groove 121 and a wire receiving groove 126 are formed in the upper frame 110 and extend to the fixed end 421.

The second vertical drive wire 420 extending from the fixed end 422 extends to the fixed end 421 such that it is received in the wire receiving grooves 120, 119, 159, 215, 162, 121, 126.

The second vertical drive wire 420 is also formed with slight elasticity, and is pulled tight such that two ends are fixed to the two fixed ends 421, 422. Accordingly, the second vertical drive wire 420 is apt to length contraction (separately from power application), and comes into contact with the periphery of the body 10 in whole due to the tension.

As best shown in FIG. 8, coil springs 131, 132 are connected to the lower part of the upper frame 110, and the bottom of each of the coil springs 131, 132 comes into contact with the two guide parts 214.

The coil springs 131, 132 is placed in slightly compressed state even when the vertical moving member 210 is located at the lowest position, and applies a force pressing down the vertical moving member 210.

The contraction force of the first vertical drive wire 410 and the second vertical drive wire 420 (without power application) and the resilience of the coil springs 131, 132 are balanced, so that the vertical moving member 210 is held in place with no active control.

When electrical energy is applied to the first vertical drive wire 410 and the second vertical drive wire 420 to induce length contraction, as shown in FIG. 8, the fixed ends of the vertical drive wire are placed higher than the bottommost of the vertical moving member 210, and the vertical moving member 210 is pulled toward the fixed ends 411, 412 and moves upward vertically. In this instance, when compressed, the coil springs 131, 132 store elastic resilience.

When the electrical energy applied to the first vertical drive wire 410 and the second vertical drive wire 420 is interrupted, the two vertical drive wires are restored to the original shape and increase in length. When the coil springs 131, 132 return to the original state, the coil springs 131, 132 press the vertical moving member 210, and in response, the vertical moving member 210 moves downward.

Meanwhile, the body 10 according to this embodiment includes two rows of wire-type actuators (hereinafter, referred to as "horizontal drive wire") 430, 440 to horizontally move the horizontal moving member 250.

One end of the first horizontal drive wire 430 is fixed by a bolt at a fixed end 431 formed on one side surface of the upper frame 110, and the other end is fixed by a bolt at a fixed end 253 formed at the bottom of one side of the moving body 251 of the horizontal moving member 250 protruding out of the vertical moving member 210.

A wire receiving groove 252 is formed adjacent to the fixed end 253, and a wire receiving groove 158 is formed in vertical direction in the middle of the side frame 155.

A wire receiving groove 118 is formed in vertical direction aside the fixed end 431 on one side surface of the upper frame 110, and a wire receiving groove 117 is formed on the top of the upper frame 110 substantially over the full width of the upper frame 110.

A wire receiving groove 122 is formed in approximately "U" shape on the other side surface of the upper frame 110, and a wire receiving groove 116 is formed on the top of the upper frame 110 parallel to the wire receiving groove 117.

The first horizontal drive wire 430 extending from the fixed end 253 slightly hangs over the wire receiving groove 252, extends through the wire receiving groove 158, and extends to the other side of the upper frame 110 via the wire receiving groove 118 and the wire receiving groove 117.

The first horizontal drive wire 430 extends downward along the side surface of the upper frame 110 through the "U" shaped wire receiving groove 122, then changes the direction, extends upward, goes through the wire receiving groove 116 again, and extends to the fixed end 431 formed on the same side as the fixed end 253.

When the first horizontal drive wire 430 contracts, the first horizontal drive wire 430 is pulled toward the fixed end 431, and in this instance, as the direction of the force is changed through the wire receiving groove 122, the body 251 of the horizontal moving member 250 moves horizontally to the end side at which the fixed end 253 is formed.

The first horizontal drive wire 430 is formed with slight elasticity, and is pulled tight such that the length becomes slightly longer than the original length and two ends are fixed to the two fixed ends 431, 253. Accordingly, the first horizontal drive wire 430 is apt to length contraction (separately from power application), and comes into contact with the periphery of the body 10 in whole due to the tension.

According to this configuration, the length contraction of the first horizontal drive wire 430 is immediately reflected on the movement of the horizontal moving member 250, and only with the structure of being received in the groove-shaped wire receiving groove, it can be fixed over the entire length without departing from the body 10. Further, the first horizontal drive wire 430 extends around the side surface and the upper surface of the body 100 along the wire receiving grooves, ensuring a sufficient length of the first horizontal drive wire 430 required to move the horizontal moving member 250 (for example, a wire of SMA material can increase the length by about 4% of the full length).

One end of the second horizontal drive wire 440 is fixed by a bolt at a fixed end 441 formed on one side surface of the upper frame 110, and the other end is fixed by a bolt at a fixed end 255 formed on the bottom of the other side of the moving body 251 of the horizontal moving member 250 protruding out of the vertical moving member 210.

A wire receiving groove 254 is formed adjacent to the fixed end 255, and a wire receiving groove 161 is formed in vertical direction in the middle of the side frame 156.

A wire receiving groove 123 is formed in vertical direction aside the fixed end 441 on one side surface of the upper frame 110, and a wire receiving groove 115 is formed on the top of the upper frame 110 substantially over the full width of the upper frame 110.

A wire receiving groove 113 is formed in approximately "U" shape on the other side surface of the upper frame 110, and a wire receiving groove 114 is formed on the top of the upper frame 110 parallel to the wire receiving groove 115.

The second horizontal drive wire 440 extending from the fixed end 255 slightly hangs over the wire receiving groove 254, extends through the wire receiving groove 161, and extends to the other side surface of the upper frame 110 via the wire receiving groove 123 and the wire receiving groove 114.

The second horizontal drive wire 440 extends downward along the side of the upper frame 110 through the "U" shaped wire receiving groove 113, then changes the direction, extends upward, goes through the wire receiving groove 115 again, and extends to the fixed end 441 formed on the same side as the fixed end 255.

When the second horizontal drive wire 440 contracts, the second horizontal drive wire 440 is pulled toward the fixed end 441, and in this instance, as the direction of the force is changed through the wire receiving groove 113, the body 251 of the horizontal moving member 250 moves horizontally to the end side at which the fixed end 255 is formed.

That is, the second horizontal drive wire 440 is placed to pull the horizontal moving member 250 in the opposite direction to the first horizontal drive wire 430.

The second horizontal drive wire 440 is formed with slight elasticity, and is pulled tight such that the length becomes slightly longer than the original length and two ends are fixed to the two fixed ends 441, 255.

Referring back to FIGS. 1 and 2, the front clamp 12 has a forceps 15 forming a space 16 in an approximately circular shape, into which a finger can be inserted. The forceps 15 has a predetermined strength of elasticity, and is configured to form the space 16 defining a circumference that is slightly smaller than an average adult finger circumference.

The forceps 15 tightens the finger with elasticity in close contact with the outer part of the finger, and plays a role in firmly securing the body 10 (more specifically, the body 100 of the body 10, as described below) to the finger.

The rear clamp 11 has a forceps 13 having substantially the same structure as the front clamp 12 and an approximately circular shape to form a space 14 into which a finger can be inserted.

According to this embodiment, the length of the front clamp 12 is longer than the length of the rear clamp 11, but is not necessarily limited thereto.

The front clamp 12 and the rear clamp 11 may be sized to be fitted for the user's finger, and may be omitted depending on the part in which the tactile transmission device 1 is used.

For example, an elastic and rigid pad may be formed to conform to the shape of the space 101 of the upper frame 110, so that the upper frame 110 can be fixed to the finger with appropriate strength and posture.

Figure 9:
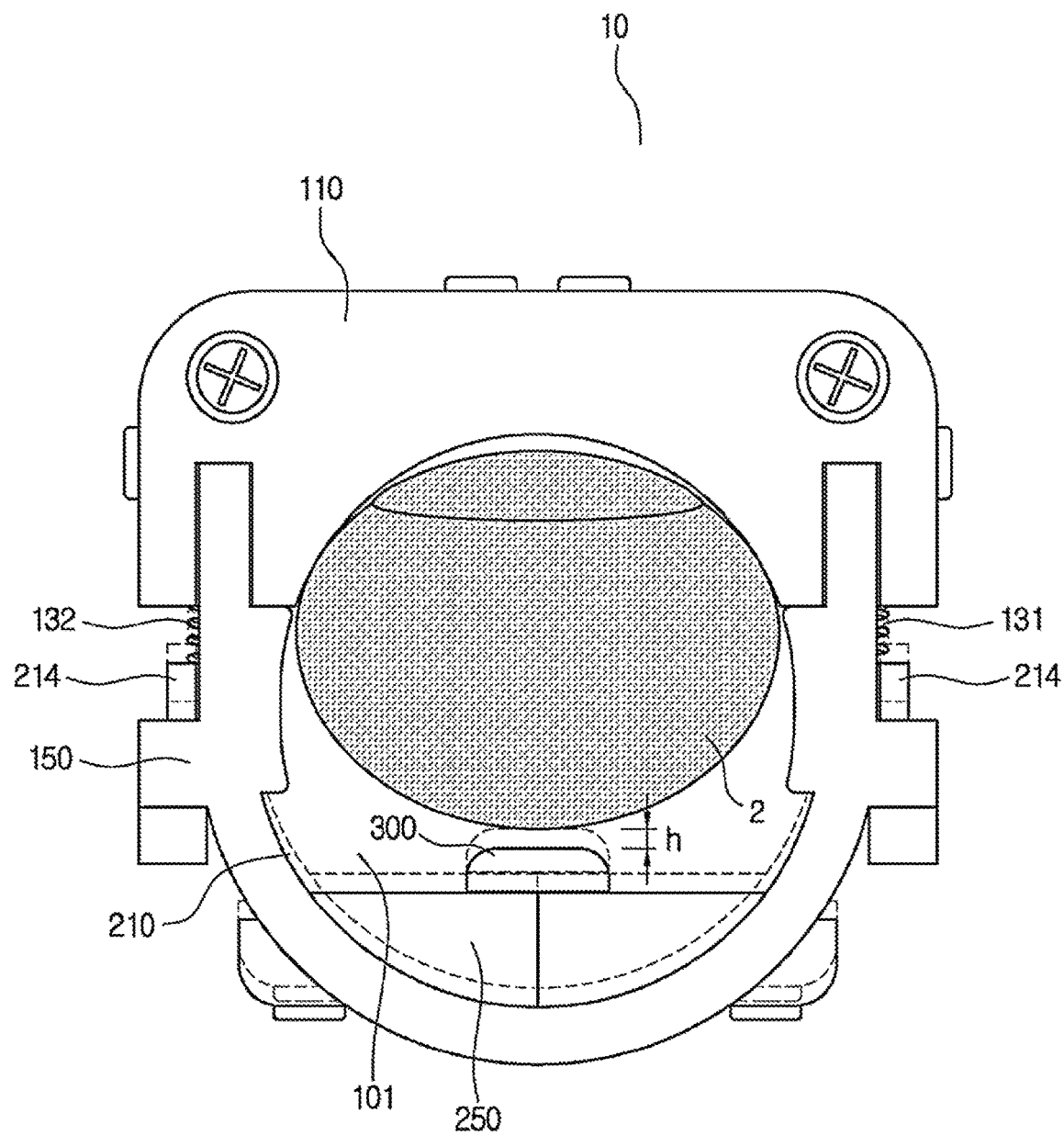
FIGS. 9 and 10 are diagrams illustrating the operation of the tactile transmission device of FIG. 1.
Figure 10:
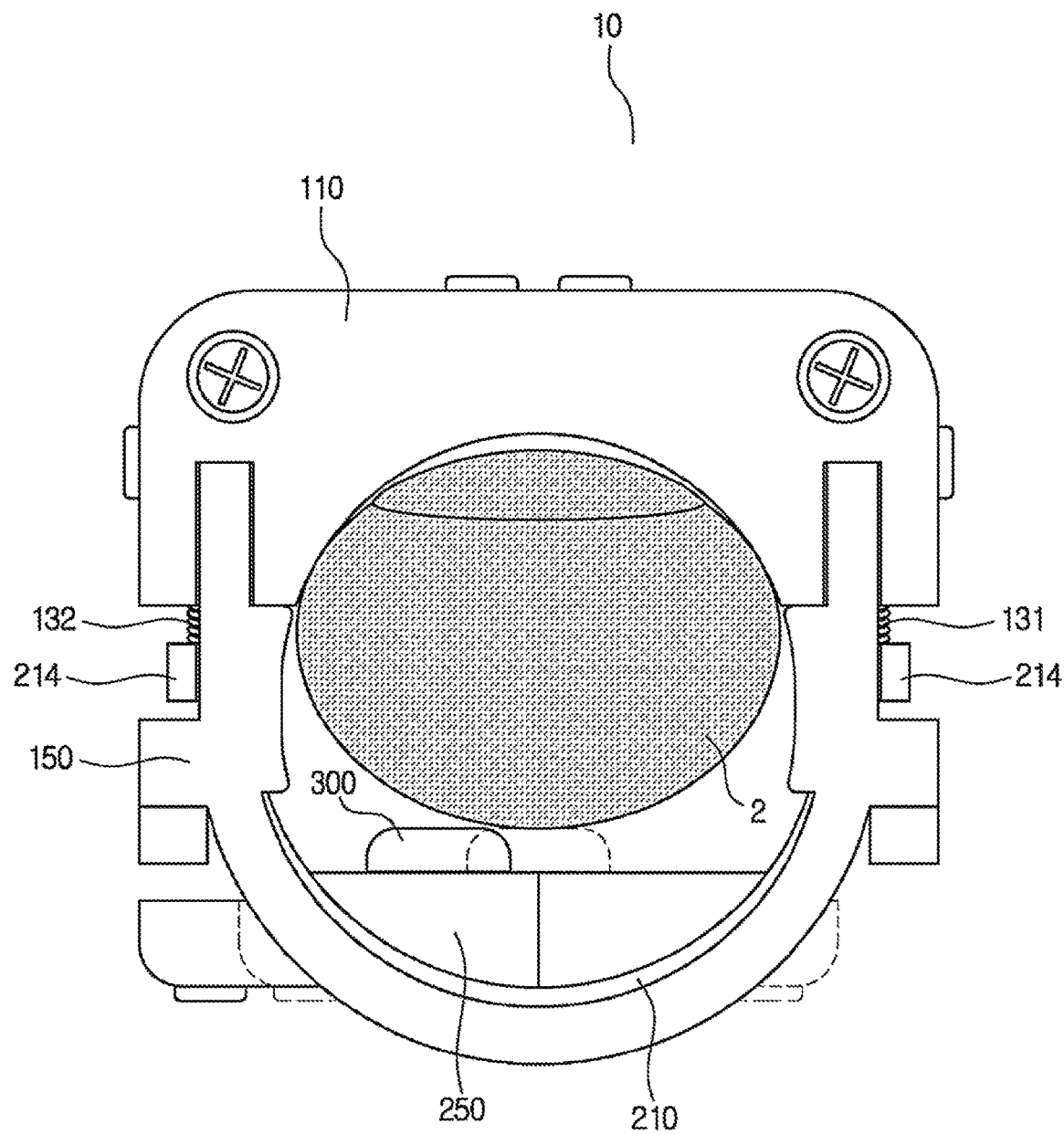

Hereinafter, the operation of the tactile transmission device 1 will be described with reference to FIGS. 9 and 10. In FIGS. 9 and 10, illustration of the wire-type actuator is omitted for convenience of illustration.

According to this embodiment, the tactile transmission device 1 is put on the last knuckle of the finger where the nail is formed. The length of the tactile transmission device 1 including the body 10 and the clamp does not exceed one finger knuckle.

This size reduction of the device can be achieved by using the wire-type actuator with very small thickness as the actuator.

When the vertical moving member 210 is moved to the bottommost, the body 100 of the body 10 is held in place by the clamps 11, 12 with a predetermined distance h between the upper surface of the contact part 300 and the finger.

The tactile transmission device 1 may be formed with various sizes depending on the thickness and length of finger knuckles in men, women and children.

At the initial position where the vertical moving member 210 is located at the bottommost, when electrical energy is applied to the vertical drive wires 410, 420, the vertical drive wires 410, 420 contracts the length and pulls the vertical moving member 210, and the vertical moving member 210 moves upward.

Accordingly, the contact part 300 moves upward together, and after the contact part 300 moves up by the distance h, the contact part 300 comes into contact with the skin of the finger.

The contracted length of the vertical drive wires 410, 420 can be controlled by adjusting the density of electrical energy, and if the vertical moving member 210 is moved further upward when the contact part 300 is in contact with the skin of the finger, the user feels in the finger a predetermined strength of pressure more than a contact sensation.

When electrical energy applied to the vertical drive wires 410, 420 is interrupted, the contact part 300 moves down as described above, and the pressure transmitted to the finger is interrupted.

When the operation of applying electrical energy to the vertical drive wires 410, 420 and interrupting the application repeats again, the contact part 300 contacts the finger and releases the contact with the finger, and the user can feel vibration.

According to this embodiment, it is possible to selectively transmit three senses including contact, pressure and vibration to the user through the vertical movement of the vertical moving member 210.

Meanwhile, as shown in FIG. 10, when the contact part 300 applies the contact/pressure to the skin of the finger, as the horizontal moving member 250 is moved, a shear force in horizontal direction may be applied to the user's finger.

For example, if electrical energy is applied to contract the first horizontal drive wire 430, in FIG. 8, the horizontal moving member 250 moves rightward and the contact part 300 sweeps the finger to provide a shear force in right direction.

In this instance, the second horizontal drive wire 440 having elasticity increases in length, and stores elastic resilience.

When electrical energy applied to the first horizontal drive wire 430 is interrupted, the first horizontal drive wire 430 returns to the original state, and the second horizontal drive wire 440 contracts the length by the elastic resilience, and pulls the horizontal moving member 260 leftward so that the contact part 300 returns to the initial center position.

At the moment that the contact part 300 returns to the initial center position, if electrical energy is applied to contract the second horizontal drive wire 440, the horizontal moving member 250 moves leftward and the contact part 300 sweeps the finger to provide a shear force in left direction. In this instance, the first horizontal drive wire 430 having elasticity increases in length and stores elastic resilience.

When electrical energy applied to the second horizontal drive wire 440 is interrupted, the second horizontal drive wire 440 returns to the original state, and the first horizontal drive wire 430 contracts the length by the elastic resilience and pulls the horizontal moving member 260 rightward so that the contact part 300 returns to the initial center position.

According to this embodiment, each of the vertical drive wires 410, 420 and the horizontal drive wires 430, 440 can independently control the length, and by selectively controlling the above wires, four tactile sensations including contact, pressure, vibration and shear force can be transmitted to the user.

The tactile transmission device 1 according to this embodiment uses the wire-type actuator with very small thickness as the actuator, thereby exerting a very great force compared to the weight. Furthermore, only when the wire-type actuator increases in thickness a bit, an increase in force relative to the weight is very great, making it very easy to reduce the size of the device.

Furthermore, because energy necessary to change the length of the wire-type actuator is relatively small, the tactile transmission device 1 can have small-sized and wireless design, thereby maximizing the user's wearability.

Figure 11:
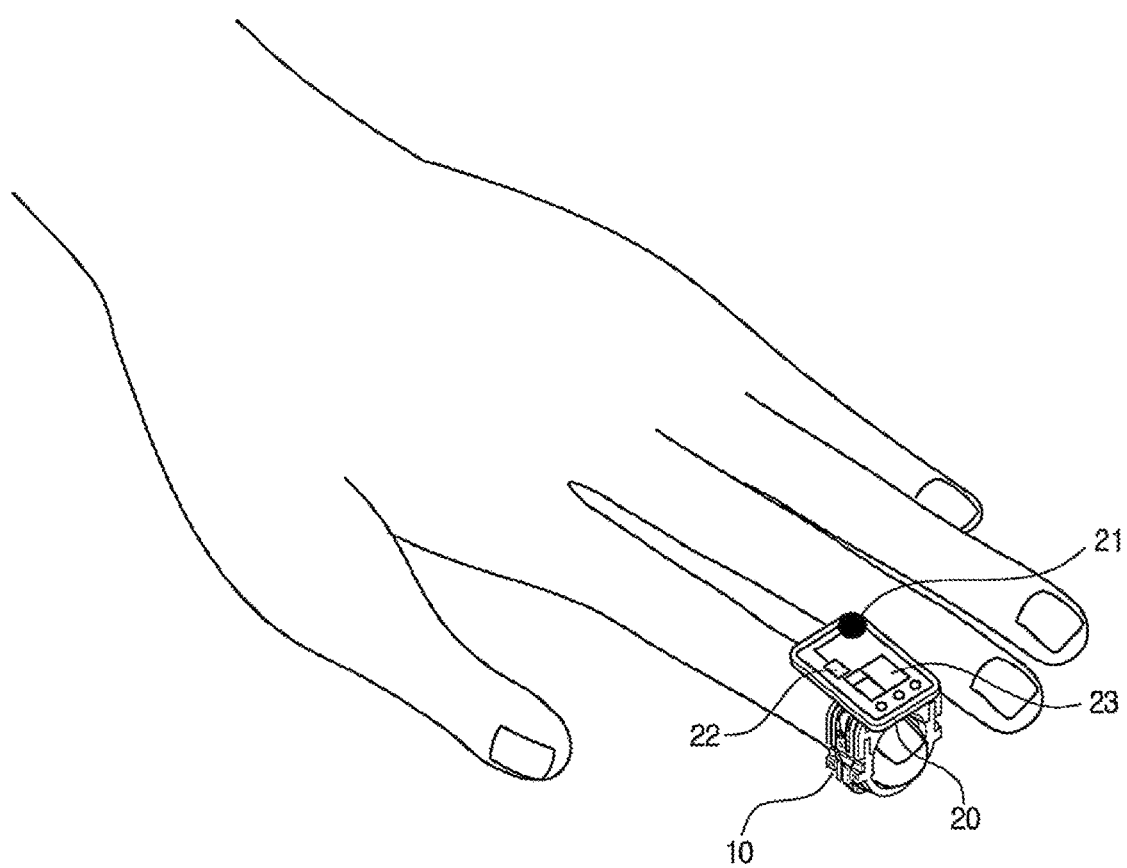
FIG. 11 is a conceptual diagram of a tactile transmission device according to an embodiment of the present disclosure.

FIG. 11 is a conceptual diagram of the tactile transmission device 1 with wireless design. In FIG. 11, only the body 10 of the tactile transmission device 1 is shown.

As shown in FIG. 11, a thin panel may be attached onto the upper frame 110 of the body 10, and a control device 22 and a small-sized battery 21 may be mounted on the panel. Furthermore, a wireless communication device 23 may be mounted together for wireless communication.

The small-sized battery 21 supplies power for driving the control device 22 and the wire-type actuators. The control device 22 controls the length change by applying electrical energy to the wire-type actuators. Although not shown in detail, the control device 22 and each wire-type actuator are electrically connected through an electrical wire to apply electrical energy.

The wireless communication device 23 transmits a control signal transmitted from the outside to the control device via wireless communication. The control signal may be a signal that designates a length change value of the wire-type actuators, and may be simply an information signal associated with the contact state with the avatar. In the latter case, the control device 22 controls the length of the actuator by converting the corresponding signal to a length change value of the wire-type actuators through a pre-mounted program.

Although FIG. 11 shows that a separate panel is laid on the upper frame, and the control device 22, the battery 21 and the wireless communication device 23 are arranged thereon, but the present disclosure is not limited thereto.

As in the above embodiment, in case that the lengths of the upper frame 110 and the lower frame 150 are equal, when the finger is compressed through the contact part 300, the user feels that the upper frame 110 compresses the finger with the same force by the reaction.

That is, the user feels that the body 100 tightens the circumference of the finger, rather than that the contact part 300 presses the skin of the finger.

Figure 12:
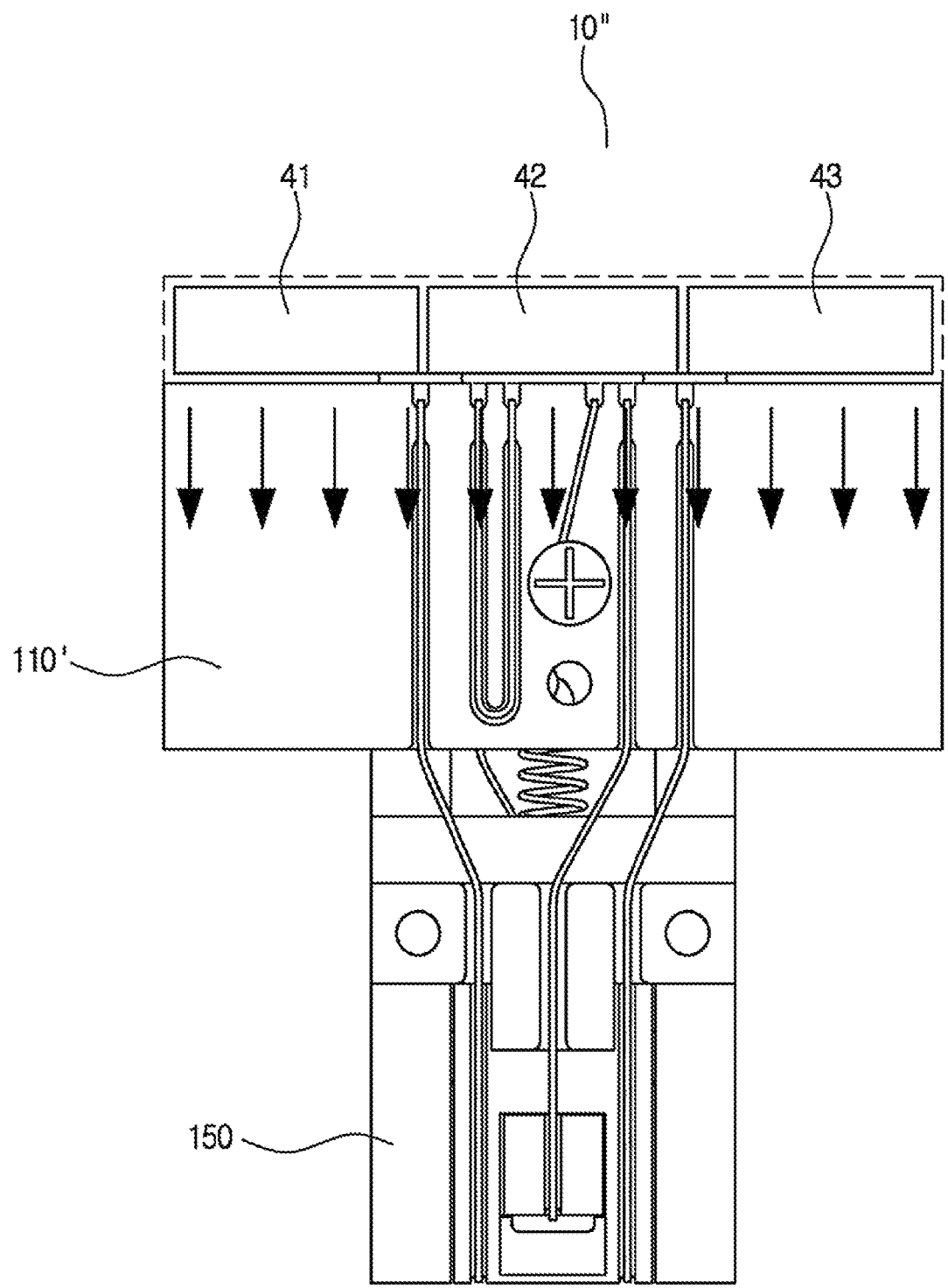
FIG. 12 is a side view of a tactile transmission device according to another embodiment of the present disclosure.

FIG. 12 shows the tactile transmission device 1 according to another embodiment for reducing this phenomenon.

The tactile transmission device according to this embodiment has the body 10" with a different shape, and specifically, the upper frame 110' is longer than the lower frame 150.

According to this configuration, when the contact part 300 presses the finger, a reaction force (as indicated by the arrow in FIG. 12) applied to the finger by the upper frame 110' is distributed over the relatively wide area of the upper frame 110', allowing the user to feel the reduced tight sensation around the circumference of the finger.

According to this embodiment, the upper frame 110' is wide enough to ensure a space for mounting a battery 41, a control device 42 and a wireless communication device 43 without installing a separate panel.

Meanwhile, because the tactile transmission device 1 according to this embodiment is very small in size, a plurality of tactile transmission devices 1 may be fitted over each finger of the hand and/or each finger knuckle, forming a series of systems.

Figure 13:
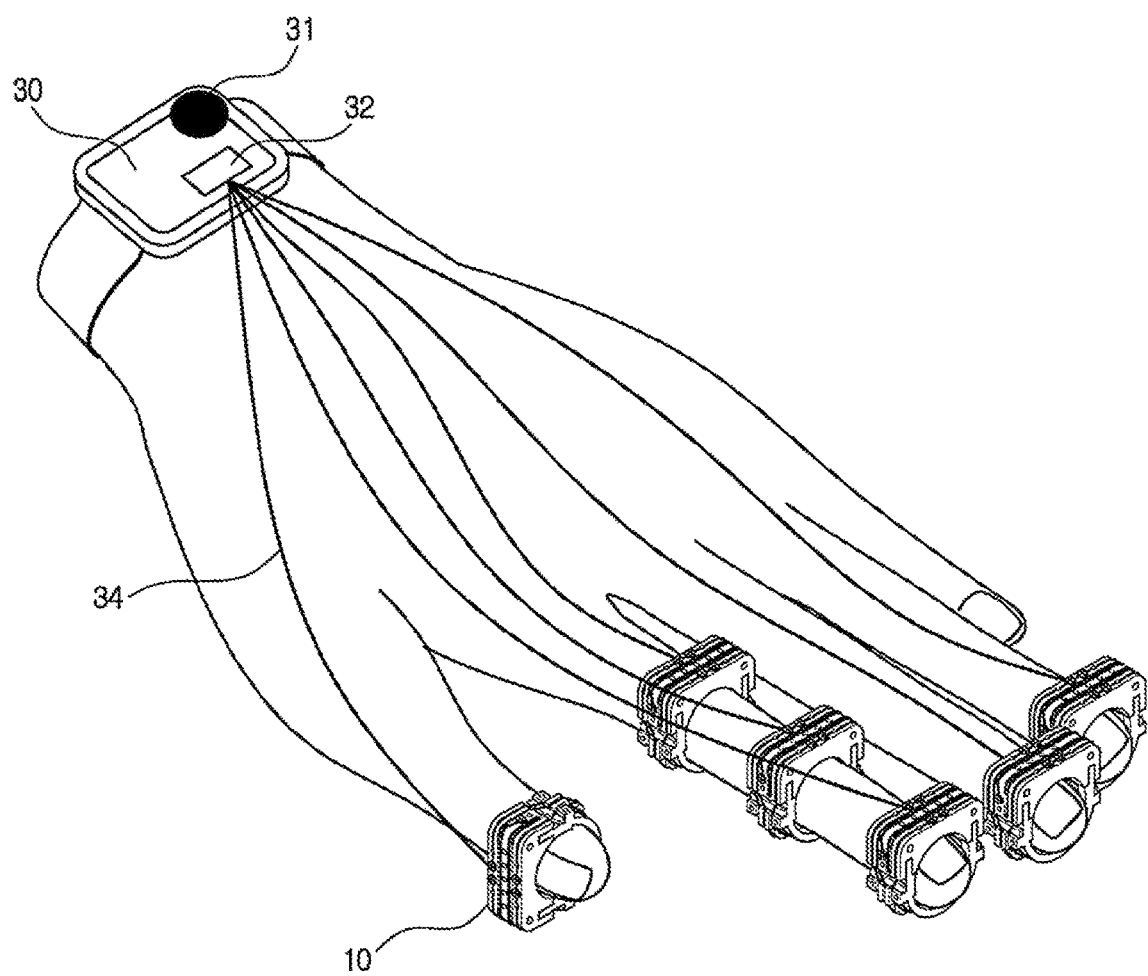
FIG. 13 shows a plurality of tactile transmission devices worn on one hand.

FIG. 13 shows the plurality of tactile transmission devices 1 worn on one hand. In FIG. 13, only the body 10 of the tactile transmission device 1 is shown for convenience of illustration.

As shown in FIG. 13, the plurality of tactile transmission devices 1 may be fitted into many parts of the finger, and may be controlled by one control device 32.

According to this embodiment, the control device 32 may be constructed by a CPU of a small computer such as a smart watch 30, and a battery 31 of the smart watch 30 may be used as a source of power for electrical energy supply.

Using the tactile transmission device 1 according to this embodiment, an user interface system can be constructed in which an avatar is moved in response to a movement of the finger.

Figure 14A:
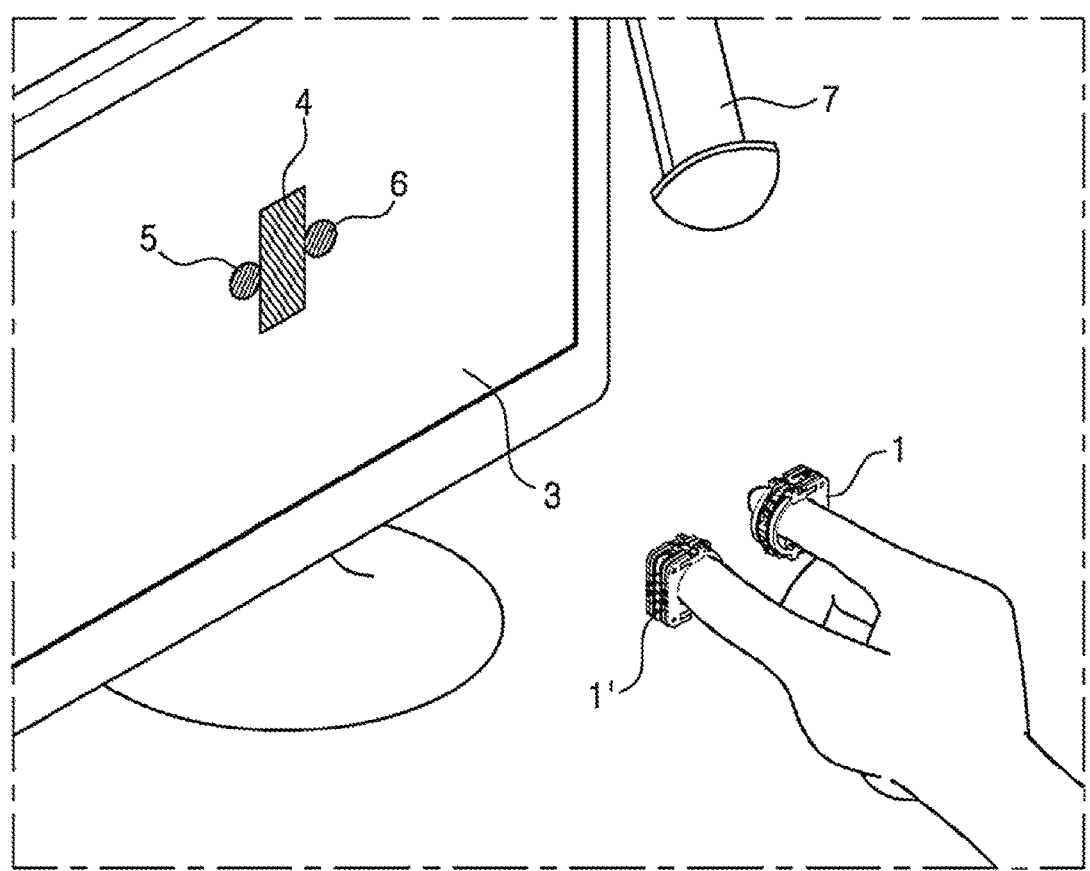
FIGS. 14A and 15A show a user interface system according to an embodiment of the present disclosure.
Figure 14B:
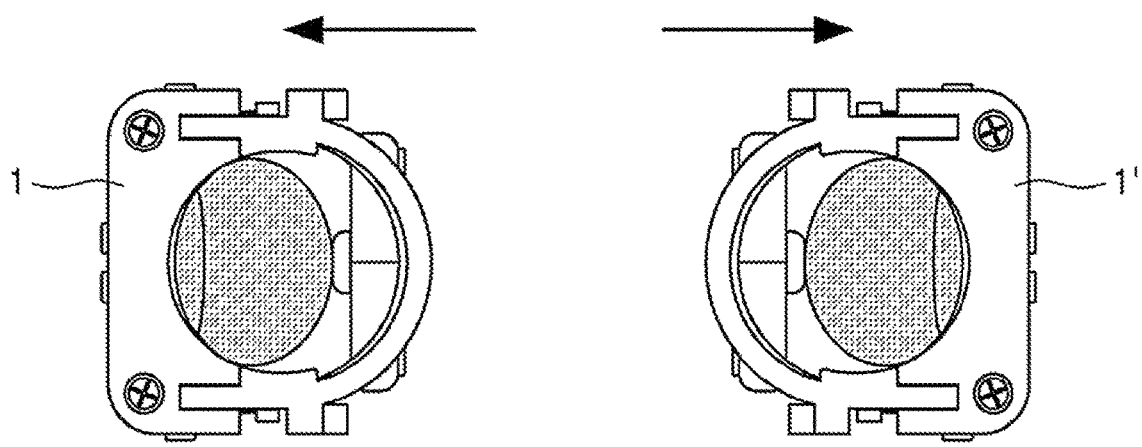
FIGS. 14B and 15B are diagrams illustrating the operation of the tactile transmission device corresponding to FIGS. 14A and 15A respectively.
Figure 15A:
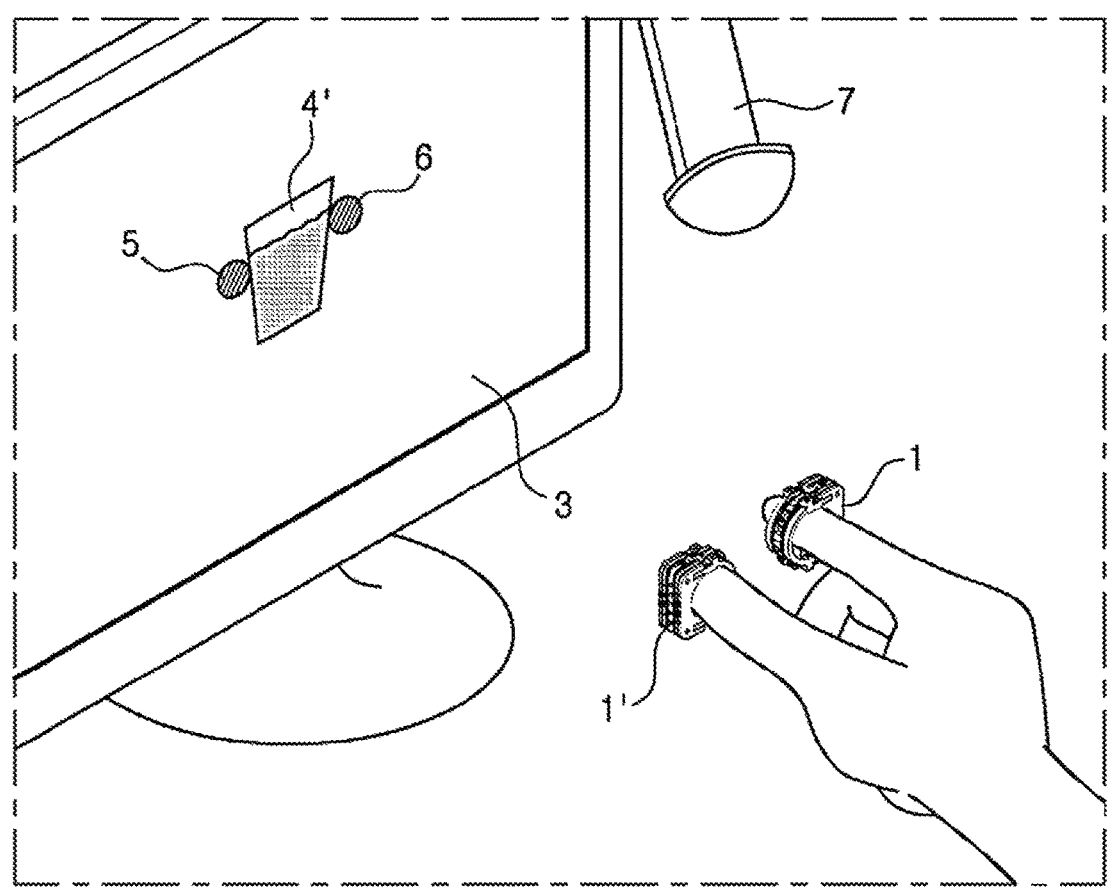
Figure 15B:
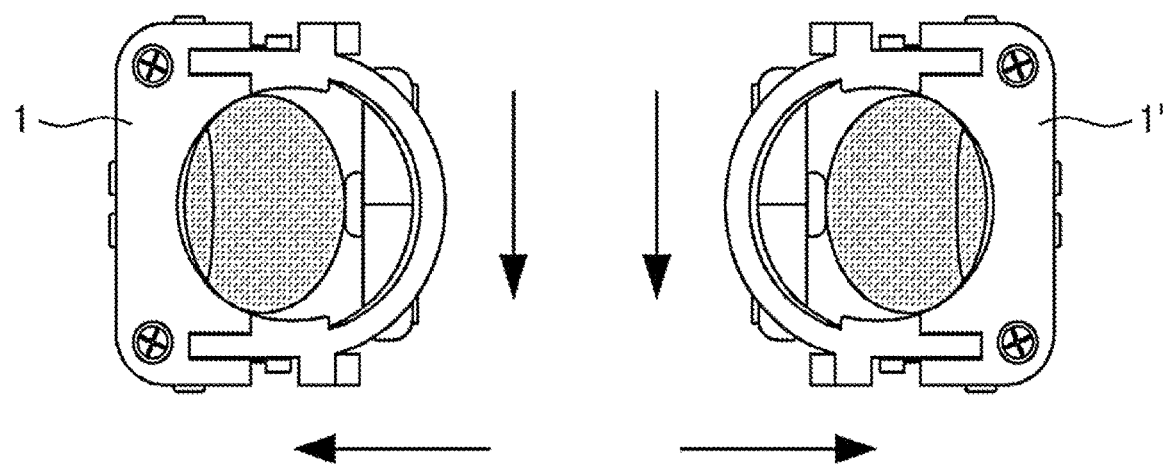

FIGS. 14A and 15A show a user interface system according to an embodiment of the present disclosure, and FIGS. 14B and 15B are diagrams illustrating the operation of the tactile transmission device corresponding to FIGS. 14A and 15A respectively.

As shown in FIG. 14A, two tactile transmission devices 1, 1' are worn on the user's fingers, and a monitor 3 displays graphics (avatars) 5, 6 operating by each finger. A computer (not shown) links graphics 5, 6 displayed on the monitor 3 with movements of the user's fingers. Specifically, a cam 7 traces the position of the two fingers (or two tactile transmission devices), and when the user moves the fingers, the two finger graphics 5, 6 move in response to the movement.

For example, when the user makes a motion of bending the fingers to grasp an object graphic 4 displayed on the monitor 3, the two finger graphics 5, 6 approach the object graphic 4.

When the two finger graphics 5, 6 come into contact with the object graphic 4, the signal is transmitted to the control device of the tactile transmission device, and the control device of the tactile transmission device transmits a contact sensation to the fingers by moving the contact parts close to the fingers as shown in FIG. 14A.

When the user makes a motion of grasping the object graphic 4 with a stronger force, the contact parts of the two tactile transmission devices further compress the corresponding fingers to allow the user to feel the corresponding pressure.

If the object graphic 4 vibrates, the contact parts transmit vibration to the fingers by reciprocating in response to the vibration.

Meanwhile, as shown in FIGS. 15A, the object graphic 4' may be set as having a predetermined weight.

For example, when the user lifts up a cup containing water with the fingers, the user feels in the finger skin the pressure due to the contact with the object and a shear force causing the skin to incline downward by the weight of the cup.

According to this embodiment, when the user makes a motion of lifting up the two finger graphics 5, 6 in contact with the object graphic 4' by moving the fingers, as shown in FIGS. 15B, the vertical moving member moves vertically, and at the same time, the horizontal moving member moves horizontally, to simultaneously provide the user with the pressure (in the direction of the left and right arrows in FIG. 15B) and the shear force (in the direction of the vertical arrow in FIG. 15B). The user can simultaneously feel a sensation of contact and weight of the object only by movements of the fingers in the air.

According to this embodiment, the user interface system is intended to operate the virtual graphic, but is not limited thereto.

INDUSTRIAL APPLICABILITY

It can be used in the field requiring the transmission of senses felt when grasping and manipulating objects in virtual reality and augmented reality, for example, in various fields including entertainment field such as game and online shopping, sensory rehabilitation medical field, education and travel, and arts exhibition and fairs.

In addition, it can be effectively used in the field requiring precise and accurate manipulation of objects in a space difficult to access, for example, remote tasks using aerospace or deep sea exploration robots.

Moreover, it can be used to provide a user interface in the field of next-generation computer with human-computer interface.

What is claimed is:

1. A tactile transmission device for transmitting a tactile sensation to a user's finger, comprising: a ring-type body which is put on a finger; a moving member which is formed such that the moving member can move with respect to the body; and a plurality of wire-type actuators which are formed so as to come in contact with the moving member, wherein each of the wire-type actuators is a solid-state actuator which changes in length when energy is applied thereto, wherein a force applied to the moving member as the plurality of wire-type actuators change in length causes the moving member to move with respect to the body, and wherein a contact part formed in the moving member comes into contact with a user's finger according to a movement of the moving member, so as to transmit a tactile sensation to the user; wherein the moving member comprises: a vertical moving member which moves with respect to the body in vertical direction toward skin of the finger; and a horizontal moving member which moves with respect to the vertical moving member in horizontal direction perpendicular to the vertical direction, and wherein the contact part is formed in the horizontal moving member such that the contact part faces the finger.

2. The tactile transmission device according to claim 1, wherein at least one end of the plurality of wire-type actuators is fixed to the body, and each of the wire-type actuators contracts the length to pull the moving member when the energy is applied.

3. The tactile transmission device according to claim 1, wherein the contact part is formed in a shape of a protrusion protruding toward the finger.

4. The tactile transmission device according to claim 3, wherein the body is connected to a clamp which tightens the finger to fix a position of the body to the finger, and
wherein the body is held in position with a gap between an upper surface of the contact part and the finger, when the vertical moving member moves to lowest.

5. The tactile transmission device according to claim 1, wherein the wire-type actuators comprise a vertical drive wire having two ends fixed to the body and extending to cover a bottom of the vertical moving member in a middle of a length, and wherein the vertical moving member moves upward approaching the finger, when energy is applied to contract the vertical drive wire.

6. The tactile transmission device according to claim 5, wherein the body has a spring which applies a force downward, and
wherein the vertical moving member moves downward by the force of the spring, when the energy applied to the vertical drive wire is interrupted.

7. The tactile transmission device according to claim 1, wherein the wire-type actuators comprise: a first horizontal drive wire having one end fixed to one side surface of the body, and the other end fixed to one side surface of the horizontal moving member; and a second horizontal drive wire having one end fixed to the other side surface of the body, and the other end fixed to the other side surface of the horizontal moving member, wherein the first horizontal drive wire and the second horizontal drive wire are placed to pull the horizontal moving member in opposite directions, and wherein the horizontal moving member is moved in horizontal direction with respect to the body, when energy is applied to selectively contract the first horizontal drive wire and the second horizontal drive wire.

8. The tactile transmission device according to claim 7, wherein the body has a wire receiving groove on side and upper surfaces to receive the first horizontal drive wire and the second horizontal drive wire, and
wherein the first horizontal drive wire and the second horizontal drive wire extend around the side and upper surfaces of the body along the wire receiving groove.

9. The tactile transmission device according to claim 1, wherein top of the body has:
a control device to control the length change of the wire-type actuators;
a battery to supply power to the control device; and
a wireless communication device to transmit a control signal transmitted from outside to the control device.

10. The tactile transmission device according to claim 1, wherein the body comprises an upper frame which covers top of the finger, and a lower frame which covers bottom of the finger, and
wherein a length of the upper frame extending in lengthwise direction of the finger is longer than a length of the lower frame.

11. A user interface system for moving an avatar in response to a finger's motion,
the tactile transmission device according to claim 1; and
a computer to link the avatar with the finger's motion,
wherein, when a predetermined contact occurs to the avatar, the contact part comes into contact with the user's finger and transmits a tactile sensation.

12. The user interface system according to claim 11, wherein the moving member comprises:
a vertical moving member which moves with respect to the body in vertical direction toward skin of the finger; and
a horizontal moving member which moves with respect to the vertical moving member in horizontal direction perpendicular to the vertical direction, and
wherein the contact part is formed in the horizontal moving member such that the contact part faces the finger.

13. The user interface system according to claim 12, wherein the contact part applies pressure to the finger as the vertical moving member comes into contact with the finger and moves upward approaching the finger, and
wherein the contact part applies vibration to the finger as the vertical moving member reciprocates upward and downward.

14. The user interface system according to claim 13, wherein, as the contact part comes into contact with the finger and the horizontal moving member moves in horizontal direction, the contact part applies a shear force to the finger.

15. The user interface system according to claim 11, wherein comprises a plurality of tactile transmission devices which is put on each finger of a hand or each finger knuckle.

* * * * *